(12) United States Patent
Putz (10) Patent No.: US 9,518,625 B2
(45) Date of Patent: Dec. 13, 2016

(54) METHOD FOR ACTUATING AN ELECTRICALLY ACTUATED FRICTION BRAKE

(71) Applicant: VE VIENNA ENGINEERING FORSCHUNGS-UND ENTWICKLUNGS GMBH, Vienna (AT)

(72) Inventor: Michael Putz, Sebersdorf (AT)

(73) Assignee: VE VIENNA ENGINEERING FORSCHUNGS-UND ENTWICKLUNGS GMBH, Vienna (AT)

( * ) Notice: Subject to any disclaimer, the term of this patent is extended or adjusted under 35 U.S.C. 154(b) by 30 days.

(21) Appl. No.: 14/784,411

(22) PCT Filed: Apr. 14, 2014

(86) PCT No.: PCT/EP2014/057504
§ 371 (c)(1),
(2) Date: Oct. 14, 2015

(87) PCT Pub. No.: WO2014/170259
PCT Pub. Date: Oct. 23, 2014

(65) Prior Publication Data
US 2016/0053839 A1    Feb. 25, 2016

(30) Foreign Application Priority Data
Apr. 15, 2013 (AT) ................. A50257/2013

(51) Int. Cl.
*B60T 7/12* (2006.01)
*F16D 65/18* (2006.01)
(Continued)

(52) U.S. Cl.
CPC ............ *F16D 65/18* (2013.01); *B60T 13/065* (2013.01); *B60T 13/741* (2013.01); *F16D 55/16* (2013.01);
(Continued)

(58) Field of Classification Search
CPC ...... F06D 65/18; B60T 13/741; B60T 8/1705; B60T 8/3535; B60T 13/065; B61H 9/00; F16D 65/18
(Continued)

(56) References Cited

U.S. PATENT DOCUMENTS

| | | | |
|---|---|---|---|
| 6,217,131 B1 | 4/2001 | Schanzenbach | |
| 6,270,172 B1 | 8/2001 | Shirai et al. | |

(Continued)

FOREIGN PATENT DOCUMENTS

| | | |
|---|---|---|
| DE | 198 26 133 | 12/1999 |
| DE | 10 2006 052 810 | 5/2008 |

(Continued)

OTHER PUBLICATIONS

Austrian Search Report conducted in counterpart Austrian Appln. No. A 50257/2013 (Mar. 21, 2014).
(Continued)

*Primary Examiner* — McDieunel Marc
(74) *Attorney, Agent, or Firm* — Greenblum & Bernstein, P.L.C.

(57) ABSTRACT

To be able to selectively influence the braking effect of a friction brake (1) in a certain operating point to be able to reliably and easily achieve regulation or control of a required setpoint braking effect of the friction brake (1), it is proposed to determine an actuation energy ($E_E$) of the electric motor (21) for the braking operation, and to determine the ascertained actuation energy ($E_E$) as the actual actuation energy ($E_{E\_actual}$) in the predefined setpoint posi- (Continued)

tion of the friction brake (1), and to determine a setpoint actuation energy ($E_{E\_setpoint}$) with respect to the setpoint position or with respect to a setpoint braking effect from known data concerning the friction brake (1), and to compensate for a deviation between the actual actuation energy ($E_{E\_actual}$) and the setpoint actuation energy ($E_{E\_setpoint}$) by actuating the friction brake (1).

11 Claims, 4 Drawing Sheets

(51) Int. Cl.
| | | |
|---|---|---|
| *B60T 13/06* | (2006.01) | |
| *F16D 55/16* | (2006.01) | |
| *B60T 13/74* | (2006.01) | |
| *F16D 121/14* | (2012.01) | |
| *F16D 121/24* | (2012.01) | |
| *F16D 125/28* | (2012.01) | |

(52) U.S. Cl.
CPC ....... *F16D 2121/14* (2013.01); *F16D 2121/24* (2013.01); *F16D 2125/28* (2013.01)

(58) Field of Classification Search
USPC .................. 701/20, 74; 303/1, 7, 74; 290/44
See application file for complete search history.

(56) References Cited

U.S. PATENT DOCUMENTS

| | | |
|---|---|---|
| 9,127,735 B2 | 9/2015 | Putz et al. |
| 2001/0033106 A1 | 10/2001 | Shirai et al. |
| 2004/0262994 A1* | 12/2004 | Baumann .............. B60T 17/221 303/155 |
| 2009/0164172 A1* | 6/2009 | Hartmann ............... B60T 13/74 702/182 |
| 2012/0168264 A1 | 7/2012 | Putz et al. |
| 2013/0087417 A1 | 4/2013 | Yu et al. |
| 2013/0090824 A1* | 4/2013 | Garbe ....................... B60T 1/10 701/70 |
| 2014/0257664 A1* | 9/2014 | Arbitmann ................ B60T 1/10 701/71 |
| 2015/0032302 A1* | 1/2015 | Foerster ................ B60T 17/228 701/19 |
| 2015/0066324 A1 | 3/2015 | Baehrle-Miller et al. |
| 2015/0114771 A1* | 4/2015 | Putz ....................... B60T 7/042 188/158 |

FOREIGN PATENT DOCUMENTS

| | | |
|---|---|---|
| DE | 10 2007 049 562 | 4/2009 |
| DE | 10 2011 004 772 | 8/2012 |
| DE | 10 2012 202 956 | 8/2013 |
| DE | 10 2012 205 576 | 10/2013 |
| EP | 0 894 685 | 2/1999 |
| EP | 1 746 399 | 1/2007 |
| WO | 2010/133463 | 11/2010 |

OTHER PUBLICATIONS

Int'l Search Report conducted in Int'l Appln No. PCT/EP2014/057504 (Jan. 13, 2015).

\* cited by examiner

METHOD FOR ACTUATING AN ELECTRICALLY ACTUATED FRICTION BRAKE

The present invention relates to a method for actuating an electrically actuated friction brake that is driven by an electric motor, in which for a braking operation, in order to achieve a predefined setpoint braking effect of the friction brake, a brake lining is pressed against a friction surface by setting a setpoint position of the friction brake that is associated to the setpoint braking effect.

FIELD OF THE INVENTION

For braking, a friction brake produces a predefined braking torque, or analogously a braking pressure force, in general, a certain braking effect. Via the known travel-force characteristic of the brake actuation, the desired braking torque or the braking pressure force may be associated to an actuating travel distance, for example an actuating angle, which must be set in order to bring about the desired braking effect. Since the braking torque is equal to the friction force times the friction radius, and the friction force is equal to the braking pressure force times the coefficient of friction, each of these values may be interpreted as a braking effect.

Electrically actuated friction brakes utilize an electric motor for actuating the friction brake. The electric motor, possibly via an intermediate gear or transmission parts such as cams, eccentrics, levers, rods, wedges, rotation of ball ramps, screws, rolling elements in threads (ball spindles, for example), liquids, gases, etc., drives a pressing unit which moves the actuating travel distance in order to press the brake lining against the friction surface.

In cases where the electrically actuated friction brake must independently brake for safety reasons in the event of an electrical power failure, an auxiliary energy source, for example in the form of a tensioned spring, a pressure medium, etc., is often provided in order to alternatively actuate the friction brake. This is necessary in particular for machines such as cranes, elevators, etc., or also for rail vehicle brakes.

To control the friction brake, either the braking effect (braking torque, brake force, braking pressure force), or equivalently, the actuating travel distance, must be controlled, which in an electronically controlled friction brake generally takes place by means of a braking control unit, for example a PID-controller. For this purpose, heretofore the braking pressure force, for example, has been determined or estimated in some manner. In some cases a strain gauge has also been mounted on the brake caliper in order to determine the mechanical deformation, and thus deduce the pressure force. Such strain gauges, with their required analysis amplifiers, are expensive and sensitive, and would greatly increase the cost of the brake. In contrast, for hydraulic or electro-hydraulic brakes the brake pressure can be easily measured in order to very accurately deduce the pressure force, for which reason in such brakes the control may easily take place via the braking effect. For electrically actuated friction brakes, in which an electric motor presses against the brake lining via transmission elements of the pressing unit such as levers, eccentrics, cams, cables, spindles, liquids, gases, etc., as described in WO 2010/133463 A1 for example, the obvious analogy to measuring the pressure would be measuring the current in the electric motor, due to the fact that the current likewise determines the force. This means that theoretically, the braking pressure force could be measured by a current measurement of the electric motor just as well as by a pressure measurement.

In practice, however, current measurement has only limited suitability for controlling an electrically actuated friction brake. The electric motor has a state-dependent quiescent current (which is influenced, for example, by friction, temperature, etc.) which interferes with small current measurements, resulting in inaccuracies. The efficiencies of the transmission elements of the pressing unit are fairly low and in particular inconstant; i.e., with a low transmission efficiency the braking pressure force on the brake lining is not a good function of the input force into the transmission elements, determined from the current measurement. Non-linearities or even ambiguous states may prevail in which conclusions drawn concerning the braking pressure force, based on the input force, are faulty or ambiguous. Ambiguity may be present in an eccentric-actuated brake (as in WO 2010/133463 A1), for example, since due to the geometry of the eccentric, the input force initially increases with the braking pressure force, but when the eccentric approaches the dead center near the brake disc, the input force then drops again due to self-reinforcement effects in the friction brake or as the result of a suitable geometric configuration. This means that two braking pressure forces may be possible for one input force. Thus, there is no simple relationship between the input force determined from the current measurement and the braking effect that is brought about, which, however, is disadvantageous for controlling the braking effect based on the input force. When the friction brake is designed for preferably constant motor torques over the actuating travel distance, for example by means of variable gear ratios, constant current, etc., the current measurement would likewise result in a constant input force, and therefore would be of little value at all. Further unfavorable effects are mass inertia and the motor control itself. When current is used for overcoming the mass inertia of the motor, the current alone provides no information about the braking pressure force. The motor control is used for adjusting to a certain position, which generally takes place using pulse width modulation (PWM) control. This results in current pulses, but no measurable, continuous current. Another problem with current measurement is that a decision that, for example a certain braking pressure force has been achieved is based on a single current measurement, which is susceptible to error. Even very simple things complicate the current measurement. If a state is achieved slowly, for example, the motor power, and therefore the current consumption, is lower, so that the speed also has to be taken into account in determining the braking pressure force. As a result, controlling the friction brake based on a simple current measurement in the electric motor is very difficult, and therefore disadvantageous.

Controlling the friction brake via the actuating travel distance would be simpler, although more unreliable, since it cannot be concluded with certainty that a required braking effect has been achieved. For example, the effect of the wear of the brake linings, or the variable stiffness of the friction brake at different temperatures, is not taken into account, and it is not ensured that the desired braking effect has actually been achieved when the predefined setpoint position is reached.

A method for adjusting the clamping force exerted by a parking brake in a vehicle is disclosed in DE 10 2011 004 772 A1, in which the clamping operation for generating the clamping force is carried out until the generated mechanical clamping work reaches a threshold value. Thus, the actuation energy is evaluated and clamping is applied until a threshold value has been reached. This is a simple, although very imprecise, brake actuation which is sufficient for a parking brake, but which is certainly unsuitable for a service brake, in particular of a vehicle, where achieving a setpoint braking effect in an accurate, quick manner is of importance. Inadvertent over-controlling may result in undesirable, hazardous locking of the vehicle wheel, and inadvertent under-controlling may result in failure to achieve the required braking effect.

BACKGROUND OF THE INVENTION

It is therefore an object of the present invention to provide a method for actuating an electrically actuated friction brake, with which the braking effect of the friction brake may be selectively influenced in a certain operating point to be able to reliably and easily achieve regulation or control of a required braking effect of the friction brake.

This object is achieved according to the invention in that an actuation energy of the electric motor is determined for the braking operation, and the ascertained actuation energy is determined as the actual actuation energy in the predefined setpoint position of the friction brake, and a setpoint actuation energy is determined with respect to the setpoint position or with respect to a setpoint braking effect from known data concerning the friction brake, and a deviation between the actual actuation energy and the setpoint actuation energy is compensated for by actuating the friction brake. By using the actuation energy, the energy that is introduced into the friction brake during a change from an initial state of the friction brake (released, for example) to a final state of the friction brake (full braking, for example) is evaluated. The manner, and the period of time, in which the final state has been reached plays no role for the energy, so that the energy represents the final state, regardless of how it was reached. A summation (or integral) for determining the actuation energy is relatively stable with respect to individual measuring errors due to using a large number of individual values which may be averaged, which also makes the method very robust with respect to any interferences. The problems with current measurement may be easily avoided in this way. Apart from this, determining the actuation energy is easily achievable with little effort, and there are numerous options for determining the actuation energy of the electric motor, thus allowing great flexibility in carrying out the method. This allows simple, reliable control of the actuation of an electrically actuated friction brake.

By determining the actuation energy actually introduced into the actuation as the actual actuation energy with respect to the setpoint position or with respect to a setpoint braking effect, and comparing to a known setpoint actuation energy to be expected, any deviation may be easily identified and compensated for by actuating the friction brake. At the end of the braking operation, it may thus be easily checked whether the predefined setpoint braking effect due to setting the setpoint position has actually been achieved, and any identified deviation may be corrected.

BRIEF SUMMARY OF THE INVENTION

For compensating for the deviation between the actual actuation energy and the setpoint actuation energy, the friction brake may advantageously be actuated at the end of the braking operation in order to achieve the setpoint braking effect. In this way, each braking operation may be corrected, if necessary, via the actuation energy.

The correction may advantageously be made when the deviation is changed by changing the setpoint position. It is likewise advantageous to determine an actual braking effect and a setpoint braking effect from the actual actuation energy and the setpoint actuation energy, respectively, and to compensate for a deviation between the actual braking effect and a setpoint braking effect. A simple corrective intervention may thus be made in the instantaneous braking operation.

A wear adjuster of the friction brake may also advantageously be actuated at the end of the braking operation in order to change an air gap as a function of the deviation between the actual actuation energy and the setpoint actuation energy. It is thus not absolutely necessary to intervene in each braking operation; instead, any deviation may be compensated for by adjusting the wear adjuster. Controlling a braking operation may be simplified in this way.

In this regard, it is also possible to actuate a wear adjuster of the friction brake only after a certain time period after the braking operation in order to change an air gap as a function of the deviation between the actual actuation energy and the setpoint actuation energy. This also allows the time sequence of the deviation to be assessed, and an intervention to be made only when the deviation has been observed over time. Any measuring errors or inaccuracies based on the braking operation may be excluded in this way. To this end, deviations which occur are preferably averaged over this time period.

For achieving a setpoint position or setpoint braking effect, it may also be provided to determine for the braking operation an energy absorption capacity of the friction brake prior to achieving the setpoint position or the setpoint braking effect, based on a known motor braking torque of the electric motor and the actuation energy, and during the braking operation to compare the kinetic energy of the electric motor to the energy absorption capacity associated with the instantaneous position or braking effect, and when these parameters match, to switch the electric motor over to deceleration in order to influence the time sequence of the braking effect for achieving the setpoint position or the setpoint braking effect. A desired setpoint position or a desired setpoint braking effect may thus be achieved at a desired residual speed with accuracy, with an optimal actuation speed, and without overshooting.

To allow a brake actuation when the electrical power supply fails, it may be provided to drive the friction brake with a combination of the electric motor and an auxiliary energy source, the proportion of the auxiliary energy source being in the range of 0 to 100%, preferably 20 to 100%.

When the friction brake in a vehicle is used on a vehicle wheel, the setpoint braking effect may be limited to a stored, lock-free braking effect that is a function of current roadway conditions, with which locking of the vehicle wheel is prevented. Instances of locking may thus be reduced, and braking may be performed close to the available road grip limit, which generally improves the braking performance of the vehicle.

BRIEF DESCRIPTION OF THE SEVERAL VIEWS OF THE DRAWING(S)

The present invention is explained in greater detail below with reference to FIGS. 1 to 5, which schematically show advantageous embodiments of the invention by way of example and in a non-limiting manner, as follows.

DETAILED DESCRIPTION OF THE INVENTION

The invention is explained in greater detail below with reference to FIG. 1 by way of example, based on a schematically illustrated electrically actuated friction brake 1 in the form of a floating caliper disc brake. Floating caliper disc brakes, as frequently installed in vehicles, are well known per se, for which reason the properties and functioning of a floating caliper disc brake and the basic installation of a floating caliper disc brake, for example in a vehicle, are not discussed here in greater detail. However, in principle the invention may also be applied to other types of brakes, for example a drum brake. Likewise, a friction surface other than a brake disc or a brake drum may be provided, such as a more or less flat surface, for example as a brake for a linear motion.

Figure 1:
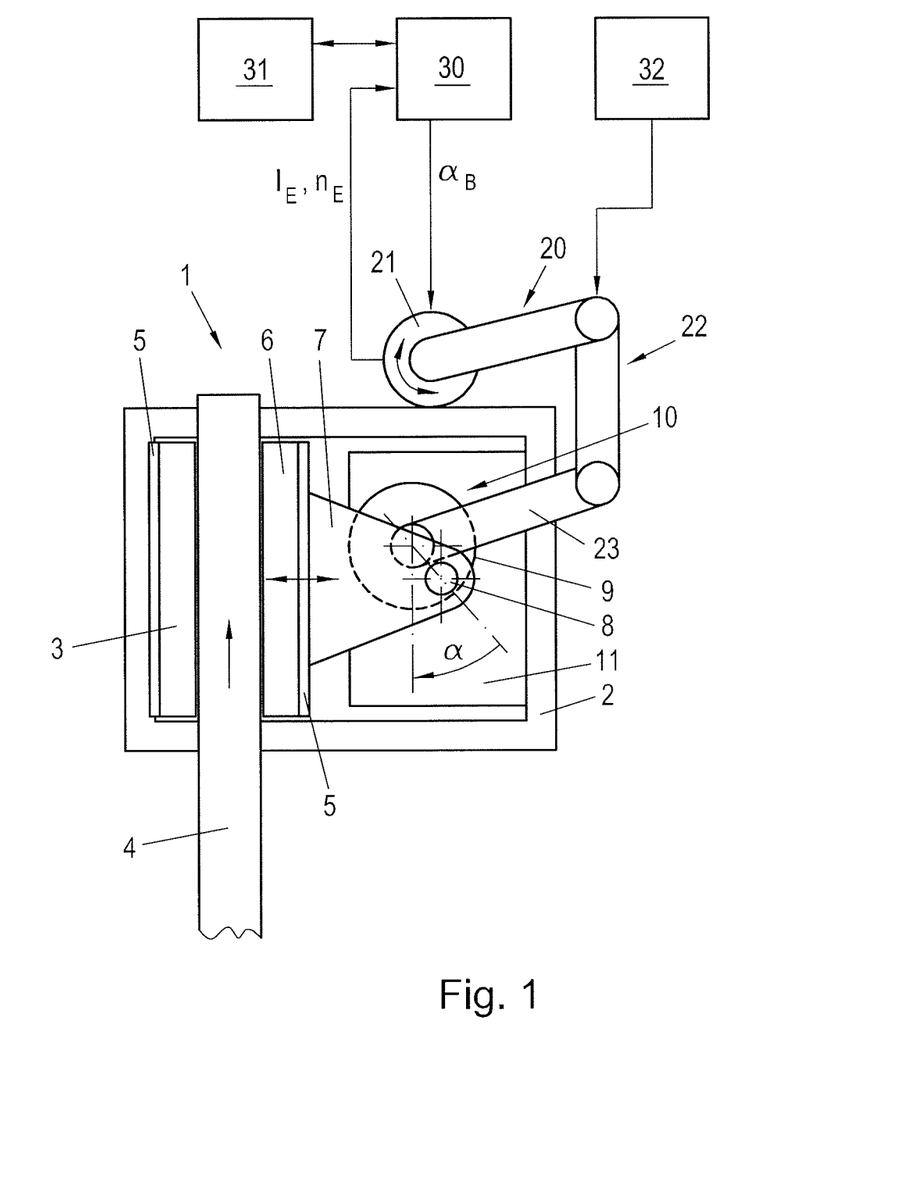
FIG. 1 shows an example of an electrically actuated friction brake.

FIG. 1 shows a friction brake 1 having a floating caliper 2 as the brake caliper, which surrounds a friction surface, in the present case in the form of a brake disc 4. A stationary brake lining 3 (relative to the floating caliper 2) and a movable brake lining 6 (likewise relative to the floating caliper 2) are situated on the floating caliper 2. For braking, the movable brake lining 6 is pressed against the brake disc 4 by means of a pressing device 10, as indicated by the double arrow in FIG. 1. The floating caliper 2 is self-centering in that way, so that both brake linings 3, 6 rest against the brake disc 4 and are pressed against same. To achieve a desired braking effect, a certain actuating travel distance must be covered in order to overcome the elasticities in the friction brake 1. This relationship is expressed as a force-travel characteristic (or equivalently, a torque-angle characteristic) of the friction brake 1. The force-travel characteristic of a friction brake 1 is known from test stand trials or calculations or simulations, based on the geometry of the friction brake 1. Pressing the brake linings 3, 6 results in the lining pressure force, which produces a certain braking torque. The brake lining 3, 6 in each case may also be situated on a lining support 5.

The pressing device 10 is situated on a brake part. The brake part may be the floating caliper 2, or, as in the present case, may be a wear adjuster 11, known per se. The wear adjuster 11 is situated on the floating caliper 2, and the pressing device 10 in turn is situated on the wear adjuster 11. The entire pressing device 10 is moved by the wear adjuster 11 for compensating for wear that occurs on the brake linings 3, 6, in order to keep the air gap within certain predefined limits. The pressing device 10 or the brake lining 3 may preferably be guided in the friction brake 1, for example in the floating caliper 2 as in the present case. Such a wear adjuster 11 is known per se in many designs, and therefore a more detailed discussion is not provided here. The wear adjuster 11 may either be used for readjustment only when there is an excessive air gap between the brake lining 3, 6 and the brake disc 4 (similarly as for drum brakes), or may be used just before each brake actuation in order to reduce the air gap (or also both air gaps) between the brake lining 3, 6 and the brake disc 4 to zero, and even to introduce a first small pressure force into the friction brake 1. At the end of the brake actuation, the wear adjuster 11 may be brought once again into a position in which very little residual braking effect is present, or an air gap may be intentionally set in order to completely lift the brake lining 3, 6 from the friction surface, thus eliminating the losses from a minimum residual braking effect. For this purpose, the wear adjuster 11 may be moved into a certain position which is away from friction contact, or may be activated for a certain time period in order to remove the brake lining 3, 6 from the friction surface. For a floating caliper disc brake, the wear adjuster 11 may also be used for completely lifting both brake linings from the brake disc, as described in greater detail in WO 2010/133463 A1 for example.

The pressing device 10, as described in greater detail in WO 2010/133463 A1 for example, includes a holding part 7 against which the brake lining 6 or its lining support 5 rests. A pressing shaft 8 is supported on both sides in the holding part 7. The pressing shaft 8 in turn is supported in an actuating shaft 9 designed as a hollow shaft, whereby the axial borehole in the actuating shaft 9 is arranged eccentrically with respect to the rotational axis of the actuating shaft 9. The actuating shaft 9, which is supported on a brake part, in the present case the wear adjuster 11, is rotated by an actuating means 20, so that by means of the eccentric borehole the pressing shaft 8 is moved toward or away from the brake disc 4, depending on the direction of rotation (indicated by the double arrow). The braking pressure forces here are thus generated via an eccentric, and the braking energy required for actuating the brake, aside from any self-reinforcing effects that occur, is applied by the actuating means 20, for example an electric motor 21. Instead of the pressing shaft 8 which is eccentrically supported in the actuating shaft 9, a shaft journal which is eccentrically situated on the actuating shaft 9 and supported on the holding part 7 could be used. Likewise, the pressing device 10 could be designed in the form of a cam which engages on the lining support 5 or on a holding part 7, or in the form of a toggle lever.

An electric motor 21, which in the present case rotates an actuating lever 23 situated on the actuating shaft 9 via a rod assembly 22, is provided as the actuating means 20. Of course, any other suitable drive could be considered as the actuating means 20, for example an electric motor which directly drives the actuating shaft 9 via a gear or a roller cam follower. The pressing device 10 has a certain fixed operating range, in the present case, for example, in the form of an actuating angular range of the actuating part, such as the actuating shaft 9. The operating range is advantageously selected in such a way that favorable transmission ratios result for producing the braking effect.

Of course, the braking pressure forces in the friction brake 1 which is actuated by the electric motor 21 may also be generated using a pressing unit having other known means, such as screws, rolling elements in threads (ball spindles, for example), wedges, rotation of ball ramps, pressures from gases or liquids, etc.

Figure 2:
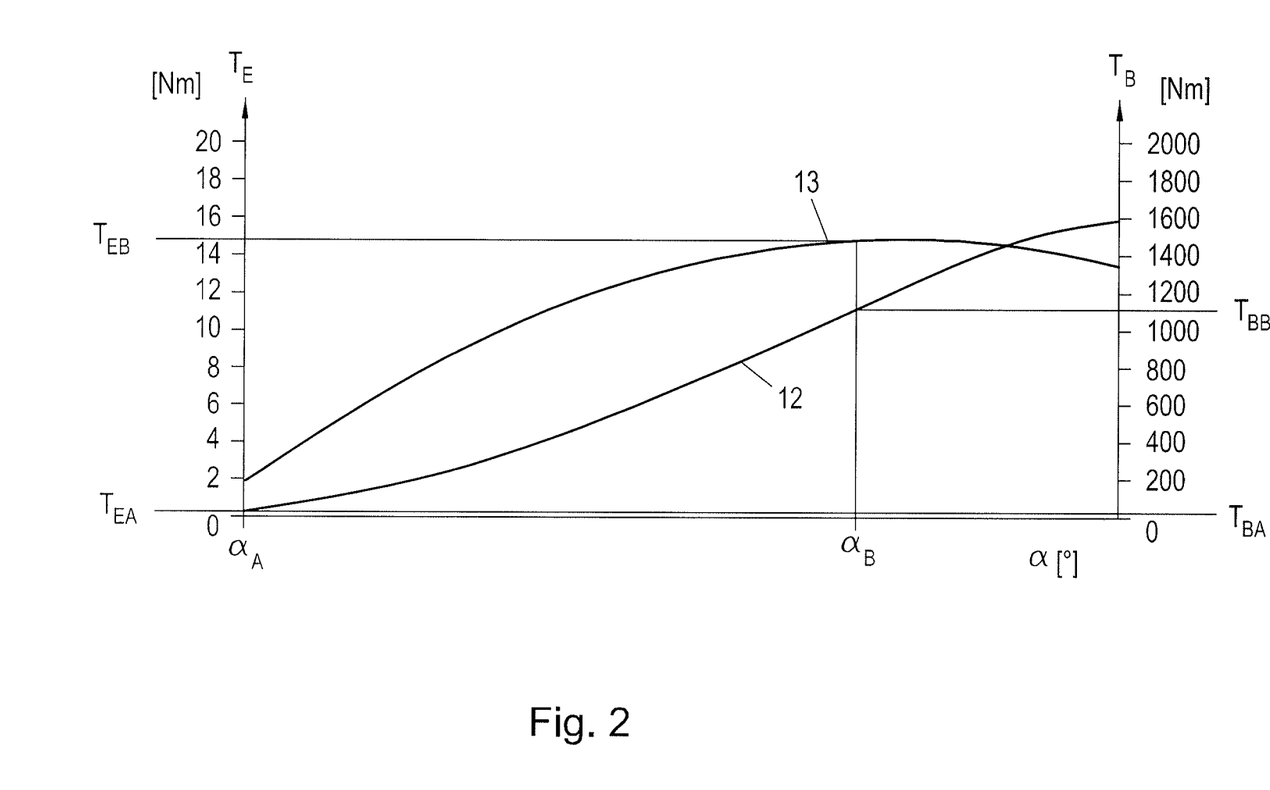
FIG. 2 shows the force-travel characteristic of such a friction brake.

Such friction brakes 1 may have a nonlinear force-travel characteristic, i.e., characteristic curves, for which there is no linear correlation between the braking effect, in the present case the braking torque $T_B$ (curve 12), for example, and the actuating travel distance, in the present case the actuating angle α, for example, as illustrated by way of example in FIG. 2. FIG. 2 likewise illustrates the actuating torque $T_E$ (curve 13) which must be applied by the electric motor 21 for achieving the braking effect. Beginning at a certain actuating angle α, the actuating torque $T_E$ may once again decrease due to self-reinforcement effects or an appropriate geometric or kinematic design of the friction brake 1, as is apparent in FIG. 2. This also results in a direct correlation between the actuating torque $T_E$ and the achieved braking torque $T_B$. These curves are known for a friction brake 1, for example from appropriate test stand trials, simulations, or calculations. However, there is generally an entire set of curves made up of such curves 12, 13 in order to take various influences, for example wear of the brake linings or temperature, into account.

The friction brake 1 is controlled by a braking control unit 30, for example, as discussed in greater detail below. The braking control unit 30 may be connected to a higher-level control unit 31, for example a driver assist system or a brake assist system (ABS, ESP, etc.) in vehicles, or a machine control system (elevator, crane, for example), or may obtain a "braking input" from some other source, such as a brake pedal. A "braking input" is understood to mean that a certain braking effect is required of the friction brake 1 as a response to a certain event, such as the driver stepping on the brake pedal, the driver assist system being activated, a machine control system signaling braking, etc. The sensors for detecting the measured values required for the control, such as motor current $I_E$ or motor speed $n_E$, are not illustrated for reasons of clarity.

A braking operation starts with an initial braking torque $T_{BA}$, which is achieved at a certain initial activating torque $T_{EA}$ and at a certain initial activating angle $\alpha_A$. The initial state may be, for example, "brake fully released", i.e., $T_{BA}=0$, or a general initial value such as in the example in FIGS. 2 and 3. The braking effect is to be increased by the pressing device 10 up to a setpoint braking torque $T_{BB}$, which results from the braking input at a certain setpoint actuating torque $T_{EB}$. The brake actuating angle $\alpha_B$ associated with the setpoint braking torque $T_{BB}$ may be determined from the known force-travel characteristic of the friction brake 1, for example from stored tables or curves. The braking control unit 30 controls the friction brake to achieve this set setpoint brake actuating angle $\alpha_B$. To ensure that the desired braking effect, in the present case in the form of the setpoint braking torque $T_B$, is achieved, the actuation energy $E_E$ applied during the braking operation, for example the mechanical energy of the electric motor 21 (indicated by the arrow in FIG. 3), or equivalently, the electrical energy of the electric motor 21, is now determined, and the braking effect is corrected if necessary. However, the determined actuation energy $E_E$ of the friction brake 1 may also be used to selectively influence the braking effect of the friction brake 1 during the braking operation, for example in a control of the friction brake 1, as discussed in greater detail below.

The actuation energy $E_E$ may be determined in various, but relatively simple ways. Since the energy is the time integral, or the sum, of the instantaneous power, which in turn results from the torque multiplied by the speed of the electric motor 21, the mechanical motor energy may be easily determined as the actuation energy $E_E$. The speed $n_E$ of the electric motor 21 may be determined by means of a suitable speed sensor, which may be installed anyway as a standard part in the electric motor 21. The torque $T_E$ of the electric motor 21 may be determined from an electrical variable, for example the motor current times the known torque constant of the electric motor 21. Although mounting of force sensors or torque sensors would likewise be possible, this would be expensive, and therefore disadvantageous in most cases. Thus, the method of torque constants is preferred due to the fact that the torque constant linearly describes the relationship between current and torque quite well over wide motor ranges. Likewise, the torque $T_E$ may also be deduced via the known mechanical motor characteristic curve of the electric motor 21, which indicates the particular speed $n_E$ that results at a particular torque $T_E$. On this basis, the torque $T_E$ associated with the speed $n_E$ may be looked up on the motor characteristic curve or in corresponding tables. If necessary, the instantaneously prevailing motor voltage may also be used for improving the accuracy by calculating a correction using the voltage, for example, by applying motor characteristic curves, for example, for various voltages, or by calculating a factor which indicates the change with the voltage, or calculating a correction using the speed constants of the electric motor 21.

Alternatively, the instantaneous electrical power could be determined via the motor current and motor voltage, and on this basis the mechanical power could be calculated via the motor efficiency. In this regard, the motor efficiency may be assumed to be constant, for example, or may be read from a predefined curve or table, or calculated. It is known that the power of the electric motor is a function of the temperature (magnet material, copper resistance) and other factors, for example age. These influences, which once again may be stored in the form of curves or tables, could be used as correction factors. However, the electrical motor energy could also be used directly as the actuation energy $E_E$.

The actuation energy $E_E$, for example in the form of the mechanical motor energy, which has been expended for bringing the friction brake 1 from the initial state $\alpha_A$ into the setpoint state $\alpha_B$, may then be determined from the instantaneous power by integration or by summation. In microprocessors, which are common in present brake control systems, summation is naturally of greater interest. For this purpose a suitable grid, for example a time grid, a grid on which the calculations are based, i.e., length or angular increments or arbitrary increments such as motor revolutions, or even a statistically random grid, may be selected in which the instantaneous power is determined, which is multiplied by the time intervals, and a running total is formed from same. For the sake of simplicity, multiplying by the time intervals may also be omitted, in which case the energy is a relative value, but which may likewise be used. Of course, the grid is selected in such a way that no adverse interactions are caused. For example, the time grid may coincide with the time grid that is used for switching the motor currents or that is correlated with same. For example, in the PWM time grid, which specifies the switch-on pulses, the current (and optionally also the voltage) and the speed $n_E$ may be measured one or more times in order to calculate the instantaneous power based on these values.

Since there are numerous physical possibilities for calculating the energy, for example force*travel, torque*angle, electrical methods, calculation using the power, etc., any physically possible calculation may of course be used. The calculation steps may be based on time increments, position increments, and even random increments, and methods without increments, for example integral and differential calculations, are possible as well as average values or representative values, since the mentioned energy principle is always present. Equivalent simplified calculations are also conceivable. When the energy is force*travel, for example, the total force may also be used, or the total current may be used for an electrical method. The energy may likewise be based on nonphysical units, for example motor steps.

The brake actuation will also have undesirable friction losses, which may also be variable over time, for example over the service life, or as a function of the temperature. The actuation energy required for a certain braking effect may therefore fluctuate due to aging, for example, or as a function of the temperature. This may be compensated for, or even used in a meaningful way, in determining the actuation energy. For example, the energy required for the actuation as well as the energy required for releasing the friction brake 1 may be measured. The difference between same is a measure for the undesirable losses of the brake actuation. Based on knowledge of the undesirable losses, for example either a signal may be output, for the purpose of maintenance or diagnosis for example, or a correction may be made. The setpoint brake actuation energy, for example, may thus be corrected as a function of the losses in order to achieve the desired setpoint braking effect. The function may once again be stored in the form of tables, formulas of relationships, models, or the like. Normal changes in the friction brake 1 may also be taken into account, for example, that brake linings 3, 6 are less rigid when hot than when cold, and that the stiffness and thus also the actuation energy therefore changes with the temperature of the brake lining or friction surface. It may likewise be taken into account that the grease in the bearings of the friction brake 1 makes the actuation more sluggish under cold conditions.

A "recalibration" of the method during operation, for example via the characteristic curves or parameters, is conceivable, for example in that the slip of the vehicle wheels or the vehicle deceleration (or in general, the deceleration of the object to be braked) is observed during braking, and it is deduced from the required setpoint braking effect and the resulting slip that the friction brakes 1 brake too much or too little, and on this basis a wear adjustment or correction of the braking effect takes place. In a simplified method it would be possible to observe, for example, whether the same slip occurs in a vehicle on the left side and right side of the vehicle over the long term, and to make a correction in the event of a deviation. The friction brakes 1 may be "recalibrated" relative to one another or also with regard to the overall performance.

Electromechanical brakes are also controlled via clamping force sensors in some cases. That could also be used here for safety reasons, for example, for determining possibly incorrect measuring results. For this purpose, further sensors (for example, clamping force sensors, force or torque sensors in the actuating drive of the brake, entrainment sensor on a brake lining, etc.) may be provided. In the event of deviations or recognized errors, measures may be taken such as request for service, switching off a faulty friction brake 1, further operation with the signal that is not erroneous, etc.

Figure 3:
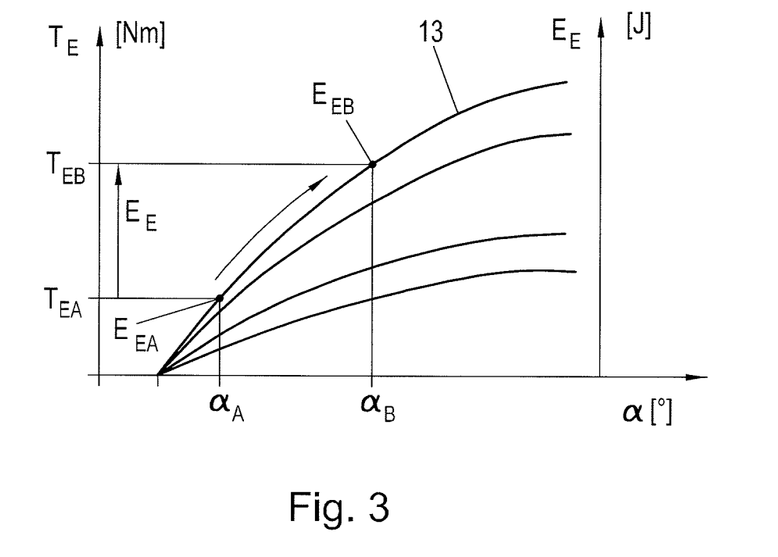
FIGS. 3 and 4 show the use of the actuation energy of the electric motor for controlling the friction brake.

If the actuation energy $E_{EA}$ introduced at the beginning of the braking operation, which may also be zero, is subtracted from the actuation energy $E_{EB}$ determined at the end of the braking operation, the result is the actuation energy $E_E$ that must be expended in order to set the predefined setpoint position, in the present case, for example, the predefined setpoint brake actuating angle $\alpha_B$ (FIG. 3). The instantaneous braking effect, for example the braking torque or braking pressure force, may be deduced on this basis. In the simplest case, it is deduced from the law of conservation of energy that the introduced actuation energy $E_E$ has also been introduced as pressing energy between the brake lining 6 and the friction surface. However, the pressing energy results from the product of the braking pressure force and the distance covered by the brake lining 6. Since the distance covered by the brake lining 6 is known from the initial brake actuating angle $\alpha_A$ and the setpoint brake actuating angle $\alpha_B$ and from the geometry or kinematics of the pressing device 10, the braking pressure force, or via the correlation with the coefficient of friction, also the braking torque, i.e., in general the braking effect, may be calculated using the known elastic behavior of the brake parts (which is known, for example, from measurement, simulations, or models of the friction brake 1). Of course, influences such as friction losses, hysteresis (different actuating forces for increasing and decreasing the braking effect) in the friction brake 1, or self-reinforcement, etc., may also be taken into account.

Figure 4:
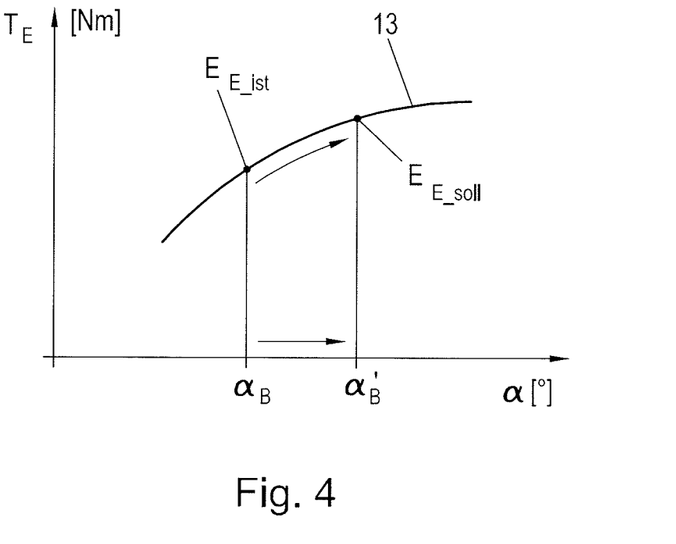

However, based on known data concerning the friction brake 1, for example the force-travel characteristic (see FIG. 2, for example), geometry, etc., it may also be deduced how much actuation energy $E_{E\_setpoint}$ must be expended in order to bring the friction brake 1 from an initial position, given by an initial activating angle $\alpha_A$ for example, into a setpoint position, given by a setpoint brake actuating angle $\alpha_B$ for example. For example, as indicated in FIG. 3, the particular actuation energy $E_E$ may be stored for each point of the force-travel characteristic (curve 13 in FIG. 2). This data may be stored in a suitable form in the braking control unit 30, for example in the form of tables, curves, formulas, simulations, neuronal networks, fuzzy logic, etc. Temperatures and other influences, such as wear on the brake linings 3, 6, may also be taken into account via various curves or in compensation calculations. The expected actuation energy $E_{E\_setpoint}$ for a certain setpoint position, for example a setpoint brake actuating angle $\alpha_B$, may thus be determined from these data. In the above-described method, if the actuation energy $E_{EA}$ introduced at the beginning of the braking is subtracted from the actuation energy $F_{EB}$ determined at the end of the braking, the result is the actual actuation energy $E_{E\_actual}$ that has actually been expended to set the predefined setpoint brake actuating angle $\alpha_B$ (FIG. 4). If the setpoint actuation energy $E_{E\_setpoint}$ deviates from the measured actual actuation energy $F_{E\_actual}$, whereby a certain tolerance window may be defined, the friction brake 1 may be readjusted for achieving the setpoint braking effect. For this purpose, a surplus or deficit of the braking effect, which results from the difference between the setpoint energy and the actual energy, is compensated for by actuating the friction brake 1, so that the setpoint actuation energy $E_{E\_setpoint}$ and the actual actuation energy $E_{E\_actual}$ are the same, optionally once again within a certain tolerance range. For example, the braking control unit 30 could change the setpoint position, for example by setting the setpoint brake actuating angle $\alpha_B'$ to be slightly greater (or smaller), or the wear adjuster 11 could be actuated to compensate for an excessively large air gap, which results in a braking effect that is too low. For the current braking operation, for example the setpoint position could be changed, e.g., the setpoint brake actuating angle $\alpha_B$ could be increased to the setpoint brake actuating angle $\alpha_B'$ in order to still achieve the desired setpoint braking effect, and after the braking operation the wear adjuster 11 could be actuated in order to readjust the air gap. In this "static" method, at the end of the braking operation, i.e., when the electric motor 21 is at a standstill, the supplied actual actuation energy $E_{E\_actual}$ is compared to the known setpoint actuation energy $E_{E\_setpoint}$, and from that the braking effect of the friction brake 1 is influenced in order to achieve the desired setpoint braking effect.

However, the findings from the determination of the actuation energy $E_E$ do not have to result in immediate interventions in the friction brake 1. For example, the finding that wear on the brake linings 3, 6 has resulted in less energy consumption may be averaged or tolerated over an extended period of time, and the wear adjuster 11 may be activated only after a certain time has elapsed. In addition, a wear warning could be output to indicate the need for replacement of the brake linings 3, 6, or a malfunction in the friction brake 1 could be recognized and possibly output. If no meaningful readjustment of the wear adjuster 11 is required, for example a readjustment which is not consistent with the braking operations or a wear model, or a readjustment which is unsteady or erratic, then faulty bearings, play, or the like may be deduced, and measures such as a request for service may be taken. In addition, statistical methods or recordings over the braking operations may be carried out, used, or output to assist with diagnostics of the friction brake 1.

The readjustment of the wear adjuster 11 due to a deviation between the actual actuation energy $E_{E\_actual}$ and the setpoint actuation energy $F_{E\_setpoint}$, or a deviation that is averaged over a period of time, may be carried out during actuation of a parking brake function, while starting the vehicle or some other object to be braked, when there are favorable opportunities, for example during a standstill, after service, etc., or also during certain braking operations. However, certain braking operations, for example full braking operations, or ABS or ESP interventions, may be excluded from the wear adjuster determination.

However, the determined actuation energy $E_E$ may also be utilized for "dynamically" influencing the braking effect during actuation of the friction brake 1. For example, an option is thus provided for directly controlling the braking effect. It is thus no longer necessary to predefine a setpoint brake actuating angle $\alpha_B$, and instead a setpoint braking effect, for example in the form of a setpoint braking torque $T_{BB}$, may be predefined. Via the above-described determination of the instantaneous braking effect, an appropriate control loop may be closed in order to influence the achieved braking effect in such a way that the desired setpoint braking effect is obtained. For this purpose, the instantaneous braking effect for the instantaneous actuating travel distance may be continuously determined as described above, and the actuation of the friction brake 1 may be controlled, to achieve the setpoint braking effect.

For direct control of the braking effect or for control of the braking effect via the actuating travel distance, a suitable controller, for example a PID controller, is implemented in the braking control unit 30. Based on the underlying requirement for the braking control unit 30 to attain the required setpoint state, in which the motor speed $n_E=0$, as quickly as possible, a certain suboptimal behavior always occurs in the control response until the setpoint braking effect is achieved. The PID controller may, for example, be designed to be too slow, or too fast, resulting in overshooting. In addition, the so-called aperiodic limit case, which is neither too fast nor too slow, can be improved, as shown. Since the braking input is generally to be implemented quickly in the control, a basically fast design of the controller, which results in the mentioned overshooting, is of interest.

However, overshooting of the braking control does cause certain problems. On the one hand, electrical energy is unnecessarily consumed in every braking operation, which is undesirable in particular for hybrid or electric vehicles. On the other hand, the overshooting may result in the holding part 7 together with the brake lining 6 striking the end position stop at high speed, in particular during opening of the brake. This may lead to damage in the friction brake 1, but also represents a problem for driving comfort due to the noise that is produced in a vehicle. This may be improved, but not completely eliminated, by making a compromise between the actuating time and the overshooting. Also more complex control algorithms are conceivable, but these are rather not desirable, in particular in vehicles, due to the higher computational requirements. However, this problem may also be eliminated by selectively influencing the braking effect based on the actuation energy $E_E$ to be applied, as discussed below.

The aim is to achieve a certain setpoint position, for example a setpoint brake actuating angle $\alpha_B$, at a certain residual speed. It is generally desirable for the residual speed to be zero, i.e., when the setpoint position in the friction brake 1 is reached, no kinetic energy $E_K$ is present, for example in the form of rotational energy with the electric motor 21 running, and the pressing device 10 or the electric motor 21 thus comes to a standstill in the setpoint position. However, it is also conceivable to reach the setpoint position at a certain residual speed. The kinetic energy $E_K$ that is present from the brake actuation should thus be dissipated in order to achieve the residual speed.

In this regard, it is noted that for simplification, in the described method it is permissible to reduce the kinetic energy $E_K$ to the rotational motion of the electric motor 21, although kinetic energy is of course also present in the motion of the pressing unit and of the brake lining 3, 6. However, the kinetic energy of the electric motor 21 clearly dominates, so that only very small, negligible error results from this simplification. However, it would be possible, of course, to also take into account the kinetic energies of other components of the friction brake 1, such as a gear, a lever, etc.

From the above discussion it is also clear that the setpoint position and the setpoint braking effect are equivalent, and are interchangeable via a known relationship. Although positions are always referred to below, the braking effect could be used instead of the position in the method described below.

Initially, the following consideration is made. For actuating the friction brake 1, the electric motor 21 must first be accelerated, and for reaching the setpoint position, for example the setpoint brake actuating angle $\alpha_B$, the electric motor must be braked, which may take place, for example, by applying a motor brake current, resulting in a motor braking torque or a motor braking energy $E_B$. Since the braking strategy of the electric motor is known, the motor braking torque or the motor braking energy $E_B$ thus generated may also be presumed to be known at any point in time. In the simplest case, a constant brake current, which results in a constant braking torque, for example, may be applied. Likewise, from the force-travel characteristic of the friction brake 1 it is known which actuating torques $T_E$, and thus via the relationship energy=torque*angle, also which actuation energy $E_E$, are/is applied before the setpoint brake actuating angle $\alpha_B$ is achieved. These two energies, the motor braking energy $E_B$ and the actuation energy $E_E$ prior to the setpoint brake actuating angle $\alpha_B$, in sum are regarded as the energy absorption capacity $E_V$ of the friction brake 1. Due to the energy absorption capacity $E_V$, the kinetic energy of the electric motor 21 which is present in each case, with the exception for a possibly desired residual energy brought about by a residual speed, may be dissipated when the electric motor 21 or the motor torque is controlled along the energy absorption capacity $E_V$.

Figure 5:
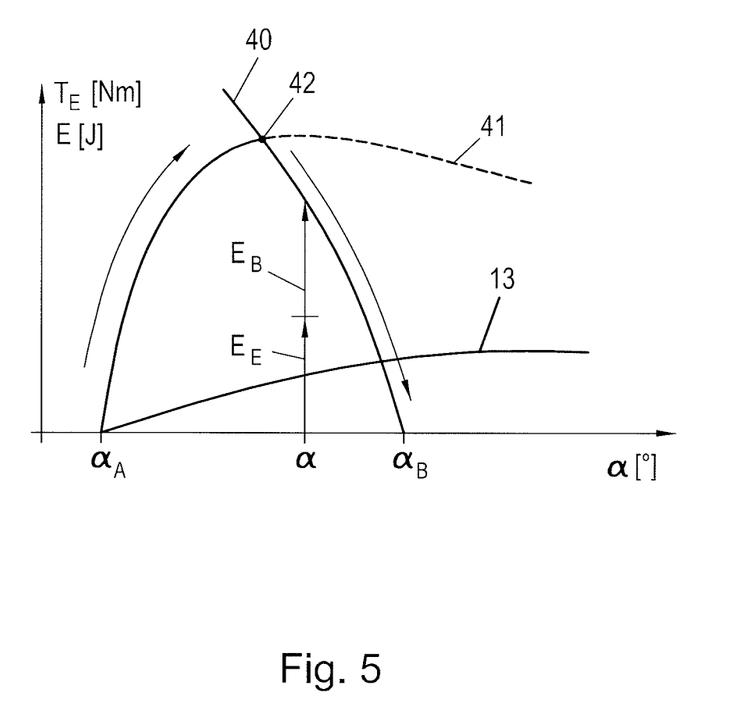
FIG. 5 shows a method for controlling the electric motor for precisely reaching a setpoint position at a desired residual speed.

The energy absorption capacity $E_V$ may now be back-calculated for each setpoint brake actuating angle $\alpha_B$, for example by calculating in each case, for the actuating angle $\alpha$ in question, the motor braking energy $E_B$ and actuation energy $E_E$ that are present, in certain actuating angular increments starting from the setpoint brake actuating angle $\alpha_B$, as illustrated in FIG. 5. In this way a curve for the energy absorption capacity $E_V$ may be determined, starting from the setpoint brake actuating angle $α_B$, as illustrated by the curve 40 in FIG. 5.

FIG. 5 also illustrates the kinetic energy $E_K$ of the electric motor 21 (rotational energy=known moment of mass inertia*angular velocity squared) over the braking operation, in the form of the curve 41. It is noted here that in the case of the residual speed of zero in the setpoint brake actuating angle $α_B$, the kinetic energy would naturally also be zero. With maintenance of a desired residual speed, kinetic energy $E_K$ would still be present in the friction brake 1 at the end of the braking operation.

For a braking operation, the energy absorption capacity $E_V$ is now determined for the desired setpoint brake actuating angle $α_B$, which is not computationally intensive and therefore is possible within the available time, for example in the braking control unit 30. This may take place prior to beginning the braking operation or during the brake actuation. At the same time, for the braking operation the kinetic energy $E_K$ of the electric motor 21 is determined, either continuously or beforehand. The kinetic energy $E_K$ may be calculated from measured values, predicted based on a model, simulated, or also taken from tables. The way in which the kinetic energy $E_K$ is ultimately actually determined is not important for the method presented here. When the kinetic energy $E_K$ intersects the energy absorption capacity $E_V$ (switchover point 42), i.e., when kinetic energy $E_K$=energy absorption capacity $E_V$, the electric motor 21 is switched over to deceleration of the braking actuation, which thus introduces motor braking energy $E_B$. The brake actuation now follows the energy absorption capacity $E_V$. It is thus ensured that the setpoint brake actuating angle $α_B$, and thus also the desired braking effect, is achieved at the desired residual speed, and in particular without overshooting or an excessively slow approach. By use of this method, the time sequence of the braking effect is influenced in order to reach the setpoint position at a residual speed.

This residual speed may be zero when it is desired to stop the pressing device 10, i.e., the electric motor 21 and the brake actuation, precisely at this point. In fact, a speed greater than zero may likewise be of interest in order to slowly pass through the predefined setpoint position, for example to observe whether locking of the wheel of a vehicle is triggered by the braking. In this case, the best or quickest possible response to the locking (or early indications thereof, such as increasing slip) may be made due to the predominantly low actuation speed. Of course, a position before the setpoint position may also be set, and the desired setpoint position may then be moved into at a low residual speed.

The above method for target attainment of the setpoint position may of course be combined with another described method. For example, when the setpoint position is reached, on the basis of the achieved actuation energy $E_E$ it may be checked whether the desired braking effect has actually been achieved. If not, the braking effect may be corrected as described. For this purpose, it may be advantageous to provide a low residual speed at the outset. It is likewise conceivable to first set a position before the actual setpoint position, using the method for target attainment, and then to switch over to the control of the braking effect.

In a vehicle as described, the braking input may originate, for example, from the driver or a vehicle system (emergency braking, for example). In general, it must be assumed that the setpoint braking effect predefined in this way could result in locking of a vehicle wheel. It is known that locking can be recognized in advance, for example based on increasing wheel slip, however, locking may also occur undetected. If the pressing device 10 is still in motion when the locking occurs, the best possible outcome is to prevent or eliminate the locking, for example by terminating the brake actuation as quickly as possible. The brake actuation is scaled back by the braking control unit 30 until the locking has ended or the wheel slip has been reduced to a tolerable level. However, this opens up the possibility for taking the locking state into account in the control of the friction brake 1. The actuation state of the friction brake 1, for example the actuating angle or the braking effect during excessive slip or the onset of locking, may be stored, so that a braking effect which brings about a lock-free braking state is known. A braking input which causes a certain braking effect may thus be limited by the stored lock-free braking effect in order to brake at the limit of the possible road grip. If the roadway conditions now become worse (recognizable by an increasing wheel slip), the braking effect must be reduced to prevent locking of the wheel. The lock-free braking effect may thus be readjusted. However, if the roadway conditions should improve (recognizable by a decreasing wheel slip, for example), a greater potential braking effect would once again be available. In a subsequent braking operation in which the required braking effect is greater than the stored, instantaneous lock-free braking effect, the predefined braking effect may thus be increased, for example every 20 wheel revolutions, in order to determine whether a greater braking effect is actually now achievable, which once again may be stored in the form of the lock-free braking effect. The locking or the wheel slip may be caused by "braking input" or the roadway condition, but also by traveling along a curve (for example, the inner wheel is subjected to less load, cornering forces) or by a laterally sloping ("hanging") roadway. The method may be used in the same way, regardless of the cause, and in addition, interventions may be made into the "braking input" for each wheel by a stability control system (ESP, ABS) implemented in the vehicle in order to reduce stability cases (ABS, for example). In contrast to hydraulic ABS, in which powerful, rapid oscillations in the pressure are produced by valves, much fewer oscillations of the braking effect occur with the present method, so that on the one hand electrical energy is saved, and on the other hand better braking is generally provided at the limit of the available grip.

When the friction brake 1 is designed in such a way that a linear energy absorption capacity $E_V$ results, for example by keeping the actuating torque essentially constant over the actuating travel distance by a nonlinear transmission in the actuation of the friction brake 1, then the back-calculation of the energy absorption capacity $E_V$ could also be stopped due to the fact that it is always the same. The method would then be greatly simplified, since when the energy absorption capacity $E_V$ is always the same (or similar), the motor speed alone, as information concerning the kinetic energy $E_K$, is sufficient for switching over to the motor braking effect at the correct point in time, or in general, at the correct point, for example at the correct angle.

For an opening motion of the friction brake 1, the energies in the above-described methods must have the appropriate, correct algebraic sign. However, in principle the methods function in the same way, and would be applied analogously in order to go from the state of a strong braking operation to the state of a weak braking operation, or into an unbraked state. Within the meaning of the invention, an opening operation is therefore regarded merely as a braking operation with an algebraic sign that is partly changed.

As described above, for a braking operation, for example at the beginning of the braking operation, at the end of the braking operation, between the beginning and the end of the braking operation, or also continuously during the braking operation, the actuation energy $E_E$ may be determined either from measurements at the electric motor 21 or from known data concerning the friction brake 1. Using the actuation energy $E_E$ which is determined in this way, it is then also possible to influence the braking effect in a targeted manner in a certain operating point of the braking operation, for example at the beginning of the braking operation, at the end of the braking operation, between the beginning and the end of the braking operation, or also continuously during the braking operation. The point in time of determining the actuation energy $E_E$ does not necessarily have to be same as the point in time during the braking operation at which the braking effect is influenced.

However, the method is not limited to the drive energy for the brake actuation coming solely from an electric motor 21, as usually provided during normal operation. For example, there are safety requirements according to which a friction brake 1 must automatically brake in the event of malfunctions or electrical power failure. An auxiliary energy source 32, for example a pretensioned spring, a pressure medium, an electrical energy store, etc., which acts on the actuating means 20 in a suitable manner for actuating the friction brake 1 (as indicated in FIG. 1) is then present for the brake actuation, and the electric motor 21 is subsequently used once again for releasing the friction brake 1. In the method it is not important whether the actuation energy comes exclusively from an electric motor 21 or from an auxiliary energy source 32, or from any combination of the electric motor and the auxiliary energy source 32. The auxiliary energy source 32 is simply combined with the actuation energy of the electric motor 21 with the correct algebraic sign.

Since, as described above, the energy is, for example force*distance, torque*angle, or the sum or the integral thereof, when the actuating travel curve of the actuation of the friction brake 1 is provided, the force (or the torque) may be determined in reverse, for example by inverse mathematical functions, numerical calculation, characteristic curves, etc. When the actuating travel distance characteristic curve is provided, the determination of the actuation energy $E_E$ may therefore also be used as a force or torque measurement, for example to determine the normal force on the brake lining 3, 6. Thus, when the travel curve is provided, a "measurement" of the normal force (or of the braking torque or the braking effect) is available. Characteristic curves of the friction brake 1 may thus be recorded at any desired times, for example during service. For example, after replacement of brake linings, an energy-travel characteristic curve may be recorded which may be converted via the known force (torques) behavior of the friction brake 1 into a characteristic curve for the actuating travel distance in dependence from the braking effect (normal force, braking torque). These determined characteristic curves may then be used for controlling the braking operations, or examined for agreement with known characteristic curves.

Instead of the absolute value of the actuation energy $E_E$, the change over time (or the change in speed) or portions of the actuation energy $E_E$ may be used. Since energy is already consumed, for example, when an air gap is overcome, it is possible, for example, to use only that portion of the determined actuation energy $E_E$ that is actually associated with pressing on the brake lining, i.e., associated with producing a braking effect. The energy portion for overcoming an air gap may be subtracted or additionally used, for example for determining the friction in idling operation (without force on the brake lining), for compensating for friction effects, or for outputting a warning when the friction is too high.

The increase in the actuation energy $E_E$ may be utilized to recognize the contact of the brake lining 3, 6 with the friction surface, since in that case the increase in the actuation energy $E_E$ is greater.

The actuation energy $E_E$, or analogously the change in the actuation energy $E_E$ or the speed of change, may also be utilized for a wear adjuster 11, for example to establish that a brake lining 3, 6 comes into contact with the friction surface during wear adjustment. In this case, the wear adjuster 11 may again move the brake lining 3, 6 a defined distance away from the friction surface in order to obtain a defined air gap.

It is likewise conceivable to use the above-described method for actuating an electric friction brake 1 in an analogous manner, also for actuating an electrically driven wear adjuster 11 in order to set a desired air gap. In this case, the wear readjustment operation is to be understood as braking operation, and the actuation of the friction brake 1 is to be understood as actuation of the wear adjuster of the friction brake 1.

The invention claimed is:

1. Method for actuating an electrically actuated friction brake (1) that is driven by an electric motor (21), in which for a braking operation, in order to achieve a predefined setpoint braking effect of the friction brake (1), a brake lining (3, 6) is pressed against a friction surface by setting a setpoint position of the friction brake (1) that is associated with the setpoint braking effect, characterized in that an actuation energy (EE) of the electric motor (21) is determined for the braking operation, and the ascertained actuation energy (EE) is determined as the actual actuation energy (EE_actual) in the predefined setpoint position of the friction brake (1), and a setpoint actuation energy (EE_setpoint) is determined with respect to the setpoint position or with respect to a setpoint braking effect from known data concerning the friction brake (1), and a deviation between the actual actuation energy (EE_actual) and the setpoint actuation energy (EE_setpoint) is compensated for by actuating the friction brake (1).

2. Method according to claim 1, characterized in that at the end of the braking operation the friction brake (1) is actuated for compensating for the deviation between the actual actuation energy (EE_actual) and the setpoint actuation energy (EE_setpoint) in order to achieve the setpoint braking effect.

3. Method according to claim 1, characterized in that the deviation is compensated for by changing the setpoint position.

4. Method according to claim 1, characterized in that an actual braking effect and a setpoint braking effect are determined from the actual actuation energy (EE_actual) and the setpoint actuation energy (EE_setpoint), respectively, and a deviation between the actual braking effect and a setpoint braking effect is compensated for.

5. Method according to claim 1, characterized in that a wear adjuster (11) of the friction brake (1) is actuated at the end of the braking operation in order to change an air gap as a function of the deviation between the actual actuation energy (EE_actual) and the setpoint actuation energy (EE_setpoint).

6. Method according to claim 1, characterized in that a wear adjuster (11) of the friction brake (1) is actuated after a certain time period after the braking operation in order to change an air gap as a function of the deviation between the actual actuation energy (EE_actual) and the setpoint actuation energy (EE_setpoint).

7. Method according to claim 6, characterized in that deviations which occur are averaged over this time period.

8. Method according to claim 1, characterized in that for the braking operation, an energy absorption capacity (EV) of the friction brake (1) is determined prior to achieving a setpoint position or setpoint braking effect, from a known motor braking energy (EB) of the electric motor (21) and the actuation energy (EE), and during the braking operation the instantaneous kinetic energy (EK) of the electric motor (21) is compared to the energy absorption capacity (EV) associated with the instantaneous position or braking effect, and when the two match, the electric motor (21) is switched over to deceleration in order to influence the time sequence of the braking effect for achieving the setpoint position or the setpoint braking effect.

9. Method according to claim 8, characterized in that a desired residual speed of the actuation is maintained at the end of the braking operation.

10. Method according to claim 1, characterized in that the friction brake (1) is driven by a combination of the electric motor (21) and an auxiliary energy source (32), the proportion of the auxiliary energy source (32) being in the range of 0 to 100%, preferably 20 to 100%.

11. Method according to claim 1, characterized in that the friction brake (1) is operated on a vehicle wheel, and the setpoint braking effect is limited to a stored, from current roadway conditions dependent, lock-free braking effect, with which locking of the vehicle wheel is prevented.

* * * * *